2 Sheets--Sheet 1.

C. H. WILLIAMS.
Dies for Welding Links.

No. 147,461. Patented Feb. 10, 1874.

Fig. 2.ª

Witnesses:
Edwin James
K. V. Gordon

Inventor:
Charles H. Williams
per J. E. V. Holmead,
Attorney.

2 Sheets--Sheet 2.
C. H. WILLIAMS.
Dies for Welding Links.
No. 147,461. Patented Feb. 10, 1874.
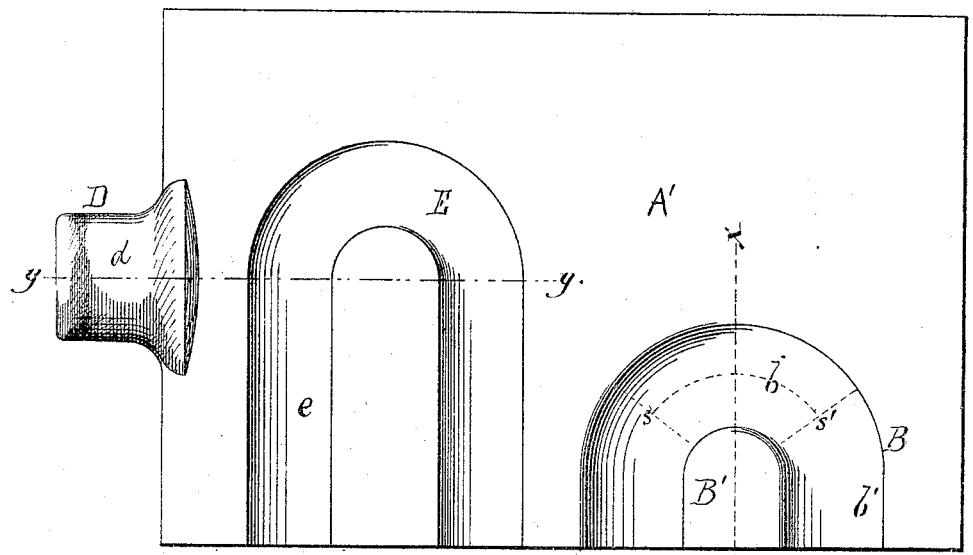
Fig. 3.
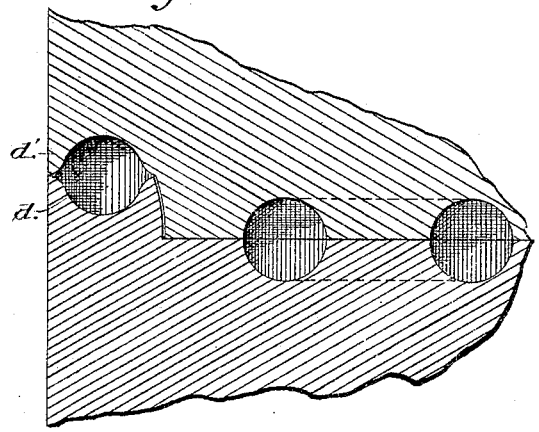
Fig. 4.
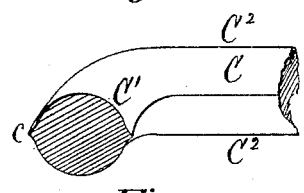
Fig. 5.
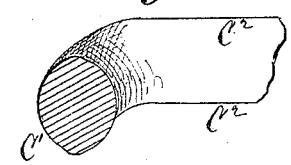
Fig. 6.
Fig. 8ª
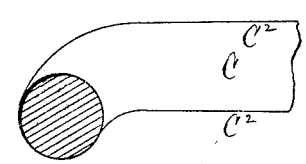
Fig. 7.
Fig. 8.
Witnesses:
Edwin James.
K. V. Gordon
Inventor:
Charles H. Williams
per J. E. F. Holmead
Attorney.
AM. PHOTO-LITHOGRAPHIC Co. N.Y. (OSBORNE'S PROCESS)

UNITED STATES PATENT OFFICE.

CHARLES H. WILLIAMS, OF CLEVELAND, OHIO.

IMPROVEMENT IN DIES FOR WELDING LINKS.

Specification forming part of Letters Patent No. 147,461, dated February 10, 1874; application filed November 24, 1873.

*To all whom it may concern:*

Be it known that I, CHARLES H. WILLIAMS, of Cleveland, in the county of Cuyahoga and State of Ohio, have invented certain Improvements in Dies for Welding Links, of which the following is a full, clear, and exact description, reference being had to the accompanying drawing and the letters of reference marked thereon, making part of this specification, in which—

Figure 1:
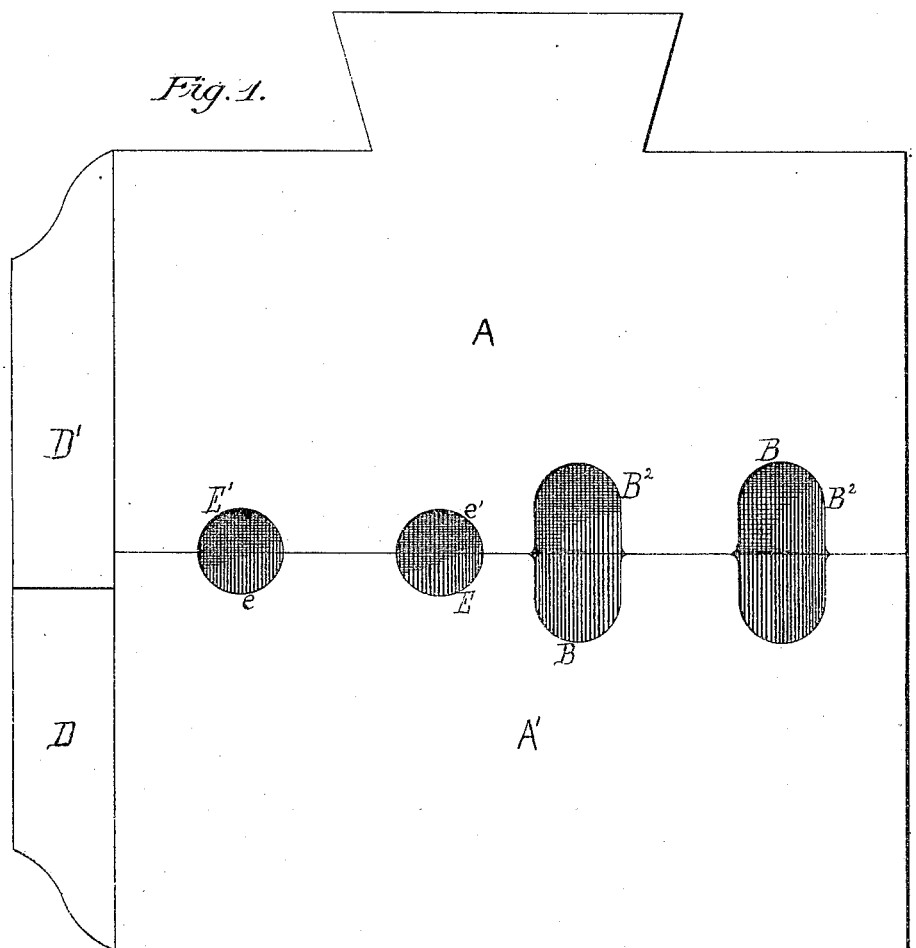
Figure 2:
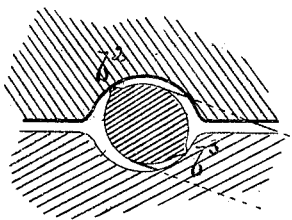
Figure 2:
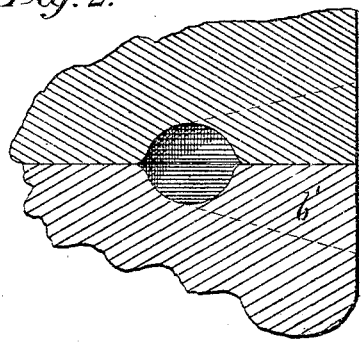

Figure 1 is an elevation of a set of dies to form the round link. Figs. 2 and 2ᵃ are detailed sectional views on the line $x\ x$, Fig. 3. Fig. 3 is a face or plan view of one of the dies, illustrating the three operations to form the round link. Fig. 4 is a sectional view on the line $y\ y$, Fig. 3. Fig. 5 is a segment of link, showing the effect of the first operation. Fig. 6 is a segment of link, showing the effect of the second operation. Fig. 7 is a segment of link, showing the effect of the third operation. Figs. 8 and 8ᵃ show the manner of welding the link.

The object of my present improvement is to provide a system of dies for welding car-coupling links, and which is designed to remedy defects which have heretofore existed in inventions of this character; and consists, chiefly, in so constructing and arranging the dies that, at the first stage of the process, and in connection with the action of the first of the series of dies, the natural spread of the metal, which is essential to the formation of a perfect weld, is provided for, as well as a means for tucking or driving in any fins which may have been laterally thrown out through the action of these dies. The nature of my invention consists in so forming the first of the series of dies as to leave a curved and flaring recess or groove at that section of their respective cavities, which are designed to inclose and act directly on the open portion of the unwelded link. From these curves or arcs the dies are so cut away as to leave grooves or cavities, parallel to each other, which run or extend at a gradual angle of inclination toward the front of the dies. These cavities are so formed as to leave a portion of the face of the die uncut away, or, as it were, a center elevation, which is designed to secure and retain the link for the proper action of the dies. The head of this elevation is curved, or of such form that while the link is held in a true horizontal position, as during the action of the dies at the first stage of the welding process, the flaring sections of the groove and curve of the center elevation will allow a natural spread of the metal. This operation being completed to the extent that these dies are designed to effect, any fins that are thrown out laterally, as is invariably the case when a surplus of metal is subjected to their action, can be tucked or driven in without removing the link from the die, but simply by shifting its position, and which the angular or deflected parallel grooves permit of being done by either elevating or depressing the link. This shifting of the position of the link brings the fins which may have been thrown out in direct contact with the positive curved sections of the cavity and center elevation, and which permits of the fins being driven or tucked in through the action of the dies, and while the metal is still at a welding heat, the welding of the link now having been accomplished. In connection with the dies referred to, a horn die or former and a female or cap die are employed. These dies perform what may be termed the second stage of my process, and are so formed that, while the expanded or spread section of the link can readily be secured in the recess or groove at the head or curved section of the horn-die, yet, owing to the peculiar form of this recess and groove, in connection with that of the female or cap die, causes this set of dies, through their joint action, not only to reduce the horizontal spread or widening of the link, and which the action of the first set of dies imparted, but, on the contrary, causes the metal to assume a new shape, and which leaves the link in proper form for the action of the third and remaining set of the series of dies, and which are simply finishing-dies, having cavities precisely of the round form and dimensions of the original bar, or of that contour which it is desired the perfect and finished link should exhibit.

The construction and operation of my invention are as follows:

A is the upper and A′ the lower die, and may be constructed of any suitable material. These dies are secured in any suitable machine in the usual manner, and may be arranged so as to be operated by any suitable driving-power. The upper die, A, is always movable, while the lower one, A', may be stationary, or, if desired, so secured as to allow of its also having a movement corresponding or similar to that of the die A. In the accompanying drawing the upper of the three sets of die-cavities, which constitute the series or system of dies employed in developing my invention, are provided or formed in the single die A, while the lower of the three sets of cavities are provided or formed on the die A'. But, while this arrangement of the upper and lower set of die-cavities, respectively, in single dies is exceedingly convenient, I desire it distinctly understood that there is nothing arbitrary about the same, as the function of the die-cavities will be precisely the same whether arranged in this manner or each set formed on separate and independent dies. The first of the series of cavities, B B, cut in the faces of the dies A A', are counterparts of each other, and their general form or outline is clearly shown in Fig. 3. When the dies are brought together the grooves $b$ $b$ and $b^1$ $b^1$ are designed to encircle or inclose the unwelded or open section of the link, and also a portion of the parallel sides of the same. These grooves $b$ $b$ and $b^1$ $b^1$ are so cut or arranged on the faces of the dies as to surround and leave center elevations $B^1$ $B^1$. These elevations are designed to secure and retain the link during the operation of welding, and so as to insure the proper action of the dies. The curved recess in each die is a flaring or spreading groove, and which, in connection with the receding or recessed section of the head of the center elevation, $B^1$, forms a half-oval curve, and which is wider than the diameter of the bar of iron out of which the link is formed. The bottom of this groove $b$ $b$ is in a nearly-straight line from the point $s$ to $s'$, as this portion performs the greatest part of forging and welding of the link. Not so with the parallel grooves $b^1$ $b^1$, which extend from the points $s$ $s'$ of the curve $b$ at a definite angle of inclination, as clearly shown in dotted lines, Fig. 2. These are true curves, and are of such contour that the sides of the bar out of which the link is formed will fit snugly in their cavities. These grooves $b$ $b$ and $b^1$ $b^1$ are therefore of such form that when the dies A A' are brought together, so that the cavities B B and the center projections $B^1$ $B^1$ shall register the grooves $b$ $b$ shall form an inclosed oval recess, while the grooves $b^1$ $b^1$ shall form an inclosed tapering or conical recess, curved at its upper and lower sections and having oblong openings in front, as shown at $B^2$ $B^2$, Fig. 1. Therefore, after the bar has been bent over a mandrel or former so as to form the link, the ends that are to be welded will have a curved form, as shown at C, Fig. 8, its ends being scarfed, as shown at C, Fig. 8ª. It is then placed in a suitable furnace and heated to a welding heat. It is then withdrawn, and the upper die A being elevated, it is placed in the cavity B on the lower die A', and encircling the center elevation $B^1$, its curved and scarfed ends resting in the flaring groove or recess $b$, and its sides in the parallel grooves $b^1$ $b^1$. Motion now being imparted to the upper die, owing to the oval form of the recess formed by the dies $b$ $b$ when brought together, the grooves $b$ $b$ soon press or hammer the link, finishing and completing the weld, but leaving it in the form shown at $C^1$, Fig. 5, and which is due to the natural spread of the metal, while, owing to the form of the recess formed by the grooves $b$ $b$, the welded section of the link assumes the form shown at $C^1$, owing to the form of the grooves $b^1$ $b^1$ and the ample space for the sides $C^2$ $C^2$ of the link to rest in which these grooves afford. The shape and outline of the sides of the link are not changed. In the process of welding, fins $c$ $c$ are almost invariably thrown out laterally, as shown in Fig. 5. The throwing out of these fins $c$ $c$ is unavoidable whenever there is a surplus of metal, or the quantity of metal at this section of the link is greater than the grooves $b$ $b$ can inclose. When these fins $c$ $c$ are thrown out, I obliterate them without removing the link from the die, and while the link is still at a welding heat. This I do by simply elevating or depressing the link from a true horizontal position, and which is its position during the process of welding to such position as will bring the fins in contact with the positive curves $b^2$ of the upper cavity B and $b^3$ of the center elevation $B^1$. This shifting of the position of the link the grooves $b^1$ $b^1$, owing to their tapering form, will readily permit. The position of the link being thus changed through the direct action of the dies, the fins are tucked in or driven back into the body of the link, and while, as has been said, the link is still at a welding heat, thus accomplishing what never before has been attained in the welding cavities of either hammer or pressure dies. Thus it will be seen by my arrangement I not only dispense with the additional set of dies now required in all devices of this character to tuck or drive in the fins, but also secure the great advantage of not being compelled to do the work on cold dies. In welding the link, the cavities B B, being constructed, of course, of metal, soon become thoroughly heated, and thus I am enabled to operate with heated surfaces on metal which is still at a welding heat, and which is, as all who are familiar with the art will admit, of primary importance. The link having been thus welded, and the fins having been tucked in through the action of the cavities B B, the first and most important stage of the process of forming the perfect and finished link is completed, and the link C now being removed its welded section is of the form shown at $C^1$, Fig. 5, but of course without the fins $c$ $c$. The link C, with its welded section $C^1$ in its present form, is not in condition to be subjected to the action of the finishing-dies E E', as before this is done it is absolutely essential that the lateral spread of the link at its welded section $C^1$ should be reduced or removed. This I accomplish at the second stage of my process, and by means of the cavities $d$ $d'$ of the projecting die or former D and the female cap-die D′, the first being stationary and the latter movable, and being operated by any suitable mechanical power. The projecting die D is of such form as to receive and secure the welded link. The recess $d$ at its head is a flaring curved groove, and is of such contour as will permit of its receiving the spread welded section C¹ of the link C. The groove $d'$ of the cap-die D′ is also slightly flaring, and is of such dimensions as in operation to entirely cover the welded arc of the link so as to prevent its parallel sides from spreading. These two grooves $d\ d'$, when they meet, form an inclosed oval recess, but not one so well defined and positive as that formed by the sections $b\ b$ of the cavities B B, and owing to their form and the fact that their flaring surfaces are designed to secure a vertical instead of a lateral spread through their joint action, they not only reduce the lateral spread which the grooves $b\ b$ imparted in welding, but insure a spread of the link in an opposite direction. To illustrate, when the welded section C¹ of the link C is placed in the recess it is of the form shown at C¹, Fig. 5. After being manipulated through the action of the dies D D′ it is pressed or hammered out of this shape, and, owing to the form of the grooves $d\ d'$, is reduced to such contour or shape as is illustrated at C′, Fig. 6, and which is also of an oval form, but one that is precisely the opposite of C¹, Fig. 5. So soon as this change of form is effected the link C is removed and placed in the finishing cavities E E′, the grooves $e\ e'$ of which are each a perfect semicircle, and are of uniform diameter throughout their entire curved and straight sections, and, consequently, when brought together throughout their entire surface, they form a true inclosed circular recess, and in which the parallel sides and lower curved end of the link exactly fit, but which is wider but not so deep as the oval welded section C′ of the link, as shown in Fig. 6. Through the joint action of the dies this oval outline is hammered or pressed down until the welded section of the link is compelled to assume the form of the circular recess formed by the grooves $e\ e'$, when the operation is finished, and a perfect and finished link of uniform dimensions throughout is produced.

I have now described three sets of dies as being used in producing the perfectly welded and finished link; but it will be readily seen by all familiar with the art that the cavities $d$ $d'$, instead of being flaring to the extent described and shown, could be formed with grooves which much more nearly approach a true circle, and which would permit the entire operation of finishing being effected by these dies D D′, but the scale will not be as perfectly removed as when the operation calls into requisition the action of the three sets of dies, as hereinbefore described.

What I claim as new, and desire to secure by Letters Patent of the United States, is—

1. The dies B B, of the form substantially as shown and described, viz., with the semicircular grooved part $b$ of a slightly-flattened section, the bottom of the cavity lying in a nearly straight line from $s$ to $s'$, and the parallel grooves $b'$, increasing in vertical section from the points $s\ s'$ to the side of the die-block, to permit of a movement of the link while in the die, as set forth.

2. The dies E E′, in combination with the dies B B and $d\ d'$, the whole being constructed and arranged substantially as described.

In testimony whereof I have signed my name to this specification in the presence of two subscribing witnesses.

CHAS. H. WILLIAMS.

Witnesses:
 EDWIN JAMES,
 JOS. T. K. PLANT.